United States Patent [19]
Schlansker et al.

[11] Patent Number: 5,999,738
[45] Date of Patent: Dec. 7, 1999

[54] FLEXIBLE SCHEDULING OF NON-SPECULATIVE INSTRUCTIONS

[75] Inventors: Michael S. Schlansker, Los Altos; Vinod Kathail, Cupertino, both of Calif.

[73] Assignee: Hewlett-Packard Company, Palo Alto, Calif.

[21] Appl. No.: 08/964,050

[22] Filed: Nov. 6, 1997

Related U.S. Application Data

[60] Provisional application No. 60/031,893, Nov. 27, 1996.

[51] Int. Cl.$^6$ ........................................................ G06F 9/45
[52] U.S. Cl. ......................... 395/709; 395/705; 395/708; 712/234
[58] Field of Search ..................................... 395/709, 708, 395/705, 581, 391; 712/215, 234

[56] References Cited

U.S. PATENT DOCUMENTS

| | | | |
|---|---|---|---|
| 5,408,620 | 4/1995 | Asakawa et al. | 395/581 |
| 5,461,722 | 10/1995 | Goto | 395/250 |
| 5,659,722 | 8/1997 | Blaner et al. | 395/581 |
| 5,748,936 | 5/1998 | Karp et al. | 395/394 |
| 5,770,894 | 6/1998 | Agarwal | 395/706 |
| 5,805,876 | 9/1998 | Bose et al. | 395/581 |
| 5,850,553 | 12/1998 | Schlansker et al. | 395/709 |

FOREIGN PATENT DOCUMENTS

| | | | |
|---|---|---|---|
| 2 284 690 | 6/1995 | United Kingdom | G06F 9/305 |

OTHER PUBLICATIONS

Choi, S.–U.; Park, S.–S.; Park, M.–S.; "Eliminating Conditional Branches for Enhancing Instruction Level Parallelism in VLIW Compiler"; Proceedings of the Second International Symposium on Parallel Architectures, Algorithms and Networks; pp. 193–199, Jun. 1996.

Choi, S.–U.; Park, S.–S.; Park, M.–S.; "Scheduling of Conditional Branches Using SSA form for Superscalar/VLIW Processors"; Proceedings of the 1996 International Conference on Parallel and Distributed Systems; pp. 344–351, Jun. 1996.

Mahlke, S.; Hank, R.; McCormick, J.; August, D.; Hwu, W.–M.; "A Comparison of Full and Partial Predicated Execution Support for ILP Processors"; ACM SIGARCH Computer Architecture News; vol. 23, No. 2, pp. 138–149, May 1995.

Pnevmatikatos, D.; Sohi, G.; "Guarded Execution and Branch Prediction in Dynamic ILP Prcessors"; ACM SIGARCH Computer Architecture News; vol. 22, No. 2, pp. 120–129, Apr. 1994.

Mahlke, S.; Hank, R.; Bringmann, R.; Gyllenhaal, J.; Gallagher, D.; Hwu, W.–M.; "Characterizing the Impact of Predicated Execution on Branch Prediction"; Proceedings of the 27th Annual International Symposium on Microarchitecture; pp. 217–227, Nov. 1994.

Wakabayashi, K.; Tanaka, H.; "Global Scheduling Independent of Control Dependencies Based on Condition Vectors"; Proceedings of the 29th ACM/IEEE Conference on Design Automation Conference; pp. 112–115, Jun. 1992.

*Primary Examiner*—Tariq R. Hafiz
*Assistant Examiner*—Brian Sattizahn

[57] ABSTRACT

A technique for flexible scheduling of a code sequence wherein a set of instructions for determining a a fully-resolved predicate for each of a set of non-speculative instructions contained in the code sequence is generated. An optimized code sequence is then generated that includes the instructions for determining the fully resolved predicates and that further includes the non-speculative instructions each guarded by one of the fully resolved predicates such that any one of the non-speculative instructions may be executed before any other of the non-speculative instructions.

36 Claims, 9 Drawing Sheets

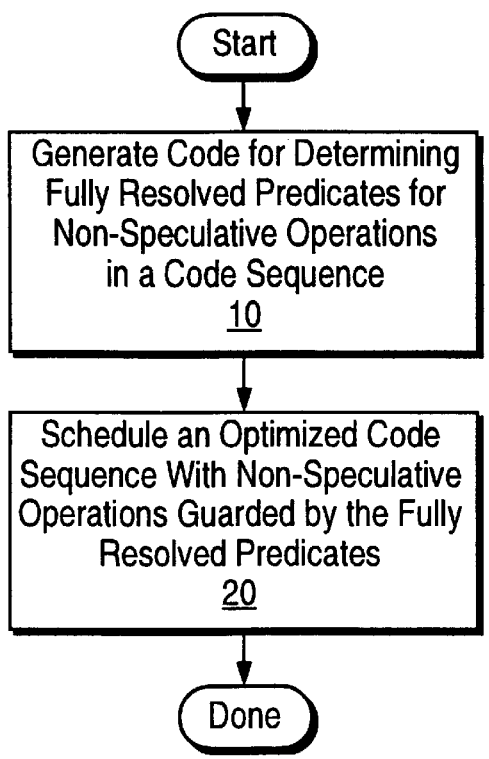
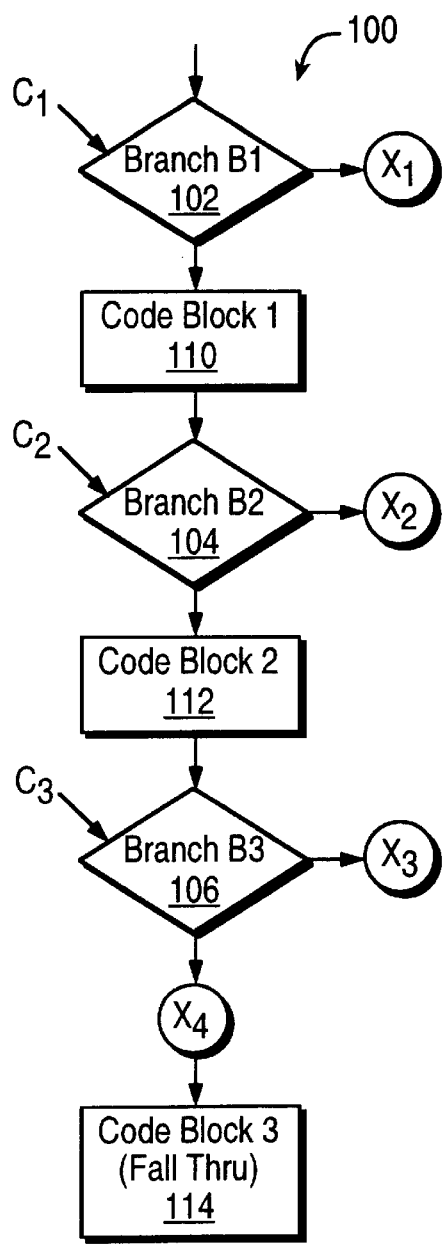

FLEXIBLE SCHEDULING OF NON-SPECULATIVE INSTRUCTIONS

This Appln claims the benefit of U.S. Provisional Appln No. 60/031,893 filed Nov. 27, 1996

BACKGROUND OF THE INVENTION

1. Field of Invention

The present invention pertains to the field of software compilers. More particularly, this invention relates to flexible scheduling of non-speculative instructions in a code sequence.

2. Art Background

Computer systems typically contain one or more processors that perform instruction execution. Such a processor may also be referred to as a central processing unit (CPU) or a host processor. A processor usually performs a variety of tasks in the computer system under control of a set of software programs. For example, such software programs typically include application programs, hardware driver programs, and operating system code for the computer system.

Such software programs may be written in one or more of a variety of programming languages. Such programming languages include higher order programming languages such as the C programming language as well as lower level assembly code languages which are specific to a particular processor architecture. Such programming languages are typically employed to define a program sequence of instructions for a software program in a human readable format. Such a program sequence of human readable instructions may be referred to as program source code.

Software compilers are typically employed to translate such program source code into a set of instructions suitable for consumption by a particular target processor. The instructions generated by such a software compiler may be referred to as object code or executable code or machine code. The instructions consumed by a target processor usually include instructions for performing memory read operations, memory write operations, arithmetic operations and conditional branch operations.

In addition, prior software compilers typically schedule the instructions in object code for execution. Typically, a software compiler schedules instructions in the object code by arranging the sequence of instructions in a particular manner. For example, a prior software compiler may schedule a particular instruction for execution prior to a branch instruction by moving the particular instructions upward to an earlier point of a program sequence in relation to the branch instruction.

Typically, an instruction that may be moved upward across a condition branch instruction without violating the correct execution of the program source code is referred to as a speculative instruction. For example, such speculative instructions include some read instructions and some arithmetic instructions. Non-speculative instructions, on the other hand, are instructions that cannot be moved upward across conditional branch instructions without violating the logic of the program source code. Such non-speculative instructions are said to be guarded by the conditional branch instruction. Examples of such a non-speculative instructions include store memory instructions and other conditional branch instructions.

Prior software compilers commonly perform scheduling optimizations to suit the architecture of a particular target processor. Such scheduling optimizations by prior software compilers usually includes the movement of speculative instructions within the object code. However, prior software compilers usually cannot move non-speculative instructions upward across other non-speculative instructions such as conditional branch instructions without violating the logic of the original source code. Unfortunately, such limits on the movement of non-speculative instructions limits the flexibility and effectiveness of prior scheduling optimization techniques.

Moreover, a target processor that consumes code generated by prior software compilers usually executes conditional branch instructions serially due to the lack of scheduling optimization. Such a serial execution of conditional branch instructions is extremely time-consuming because the target processor typically computes a branch target address for each conditional branch instruction whether or not the branch is taken. Such time consuming branch operations usually slow the overall throughput of the target processor even though in typical code sequences many of the conditional branches are rarely taken.

SUMMARY OF THE INVENTION

A compiler technique is disclosed for flexible scheduling of non-speculative instructions in a code sequence wherein the compiler generates a set of instructions for determining a fully-resolved predicate for each of a set of non-speculative instructions contained in the code sequence. The compiler generates an optimized code sequence that includes the instructions for determining the fully resolved predicates and that further includes the non-speculative instructions each guarded by one of the fully resolved predicates such that any one of the non-speculative instructions may be executed before any other of the non-speculative instructions.

A compiler according to the present technique is able to schedule the parallel execution of multiple conditional branches without the need for specialized hardware in a target processor to provide coordination between branch execution resources. The scheduling flexibility disclosed herein enables a compiler to schedule instructions to avoid the time-consuming execution of serial branch instructions in target processors having a pipelined instruction execution architecture. The scheduling flexibility disclosed herein enables a compiler to optimize code sequences by scheduling conditional branch instructions according to a likelihood of a resulting branch.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 1 illustrates a compiler technique that enables flexible scheduling of non-speculative instructions such as conditional branch instructions and store instructions;

FIG. 2 illustrates a code sequence prior to optimization including a set of code blocks which are separated by a set of intervening conditional branch operations;

DETAILED DESCRIPTION

Figure 3:
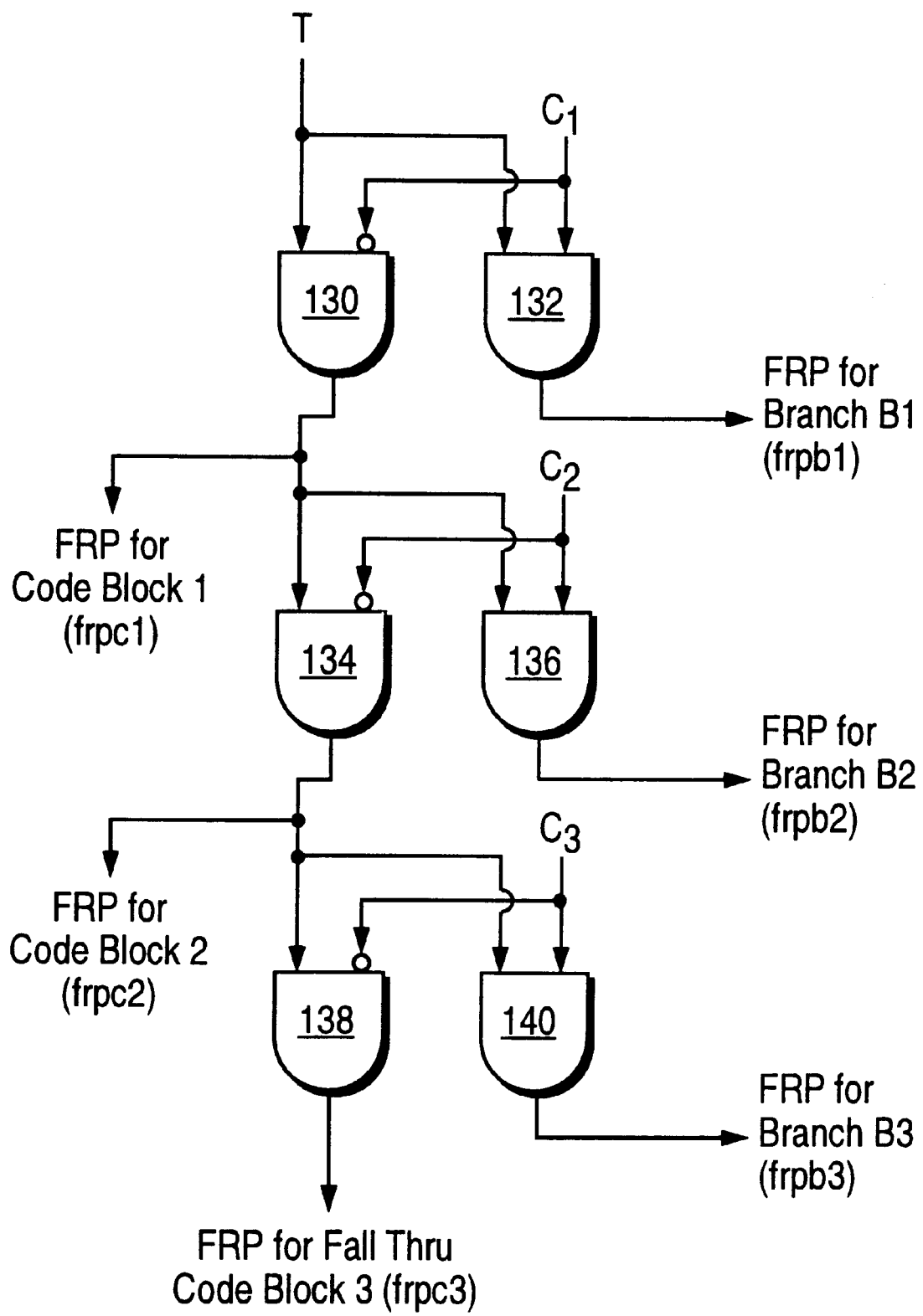
FIG. 3 illustrates logic functions for determining a set of fully-resolved predicates (FRPs) that enable flexible scheduling of the branch operations and the code blocks.

FIG. 1 illustrates a compiler technique that enables flexible scheduling of non-speculative instructions such as conditional branch instructions and store memory instructions. At step 10, code is generated for determining a set of fully-resolved predicates (FRPs) for a sequence of non-speculative instructions contained in a code sequence. The fully-resolved predicates for the non-speculative instructions may be employed to guard the non-speculative instructions in an optimized code sequence that replaces the original code sequence. At step 20, the code for determining the fully-resolved predicates along with the non-speculative instructions guarded by the fully-resolved predicates are scheduled for execution in the optimized code sequence.

FIG. 2 illustrates a code sequence 100 prior to optimization. The code sequence 100 includes a set of code blocks 110–114 (code blocks 1–3) which are separated by a set of intervening conditional branch operations 102–106 (branch operations B1–B3). The code blocks 1–3 each contain one or more non-speculative instructions such as store memory instructions and the branch operations B1–B3 represent conditional branch instructions which are also non-speculative instructions.

The branch operations B1–B3 depend on a set of corresponding branch conditions $C_1$ through $C_3$. The branch operations B1–B3 provide intermediate exit paths $X_1$ through $X_3$. A fall thru exit path $X_4$ for the code sequence 100 leads to the code block 3 which is the fall thru code block.

The branch operations B1–B3 are said to guard the corresponding code blocks 1–3. For example, the branch operation B1 is said to guard the code block 1 because the code block 1 cannot execute until the branch operation B1 resolves the branch condition $C_1$ during execution of the code sequence 100. The branch operation B1 either takes the branch to $X_1$ or falls thru to the code block 1. Similarly, the branch operation B2 guards the code block 2 and the branch operation B3 guards the fall thru code block 3.

The example code sequence 100 is shown with three code blocks and three branch operations as an example to illustrate the compiler techniques disclosed herein. These compiler techniques are readily applicable to code sequences that contain any number of code blocks and any number of intervening branch operations.

In one embodiment, the code sequence 100 is referred to as a superblock. A superblock is defined as a sequence of code having a single entry, a fall-thru exit, and one or more intermediate branch instructions that provide exit paths out of the superblock. A superblock provides a suitable region of code for optimization by a software code compiler. In other embodiments, other types of code regions may be chosen as a basis for compiler optimization operations.

Any speculative instructions that may have been present in the code sequence 100 prior to step 10 may have been relocated in the code sequence 100 in a manner consistent with known compiler optimization techniques.

FIG. 3 illustrates logic functions for determining a set of fully-resolved predicates (FRPs) that enable flexible scheduling of the branch operations B1–B3 and the code blocks 1–3. The logic functions for determining FRPs are, in this example, represented by a set of logical AND functions 130–140. The logical AND functions 130–140 may be realized by AND instructions in an optimized code sequence. The logical AND functions 130–140 may alternatively be realized by logical OR instructions by appropriately inverting the true/false state of the branch conditions $C_1$ through $C_3$ according to DeMorgan's law.

In the example shown, the FRP for the branch operation B1 (frpb1) is generated by the logical AND function 132 on the branch condition $C_1$ and a true (T) input which represents an entry path into the code sequence 100. As a consequence, frpb1 is equal to the branch condition $C_1$. The FRP for the code block 1 (frpc1) is generated by the logical AND function 130 on an inverted branch condition $C_1$ and the true (T) input. As a consequence, frpc1 is equal to the inverse of the branch condition $C_1$.

The FRP for the branch operation B2 (frpb2) is generated by the logical AND function 136 on the branch condition $C_2$ and frpc1. The FRP for the code block 2 (frpc2) is generated by the logical AND function 134 on an inverted branch condition $C_2$ and frpc1. Similarly, the FRP for the branch operation B3 (frpb3) is generated by the logical AND function 140 on the branch condition $C_3$ and frpc2. The FRP for the code block 3 (frpc3) is generated by the logical AND function 138 on an inverted branch condition $C_3$ and frpc2.

Figure 4:
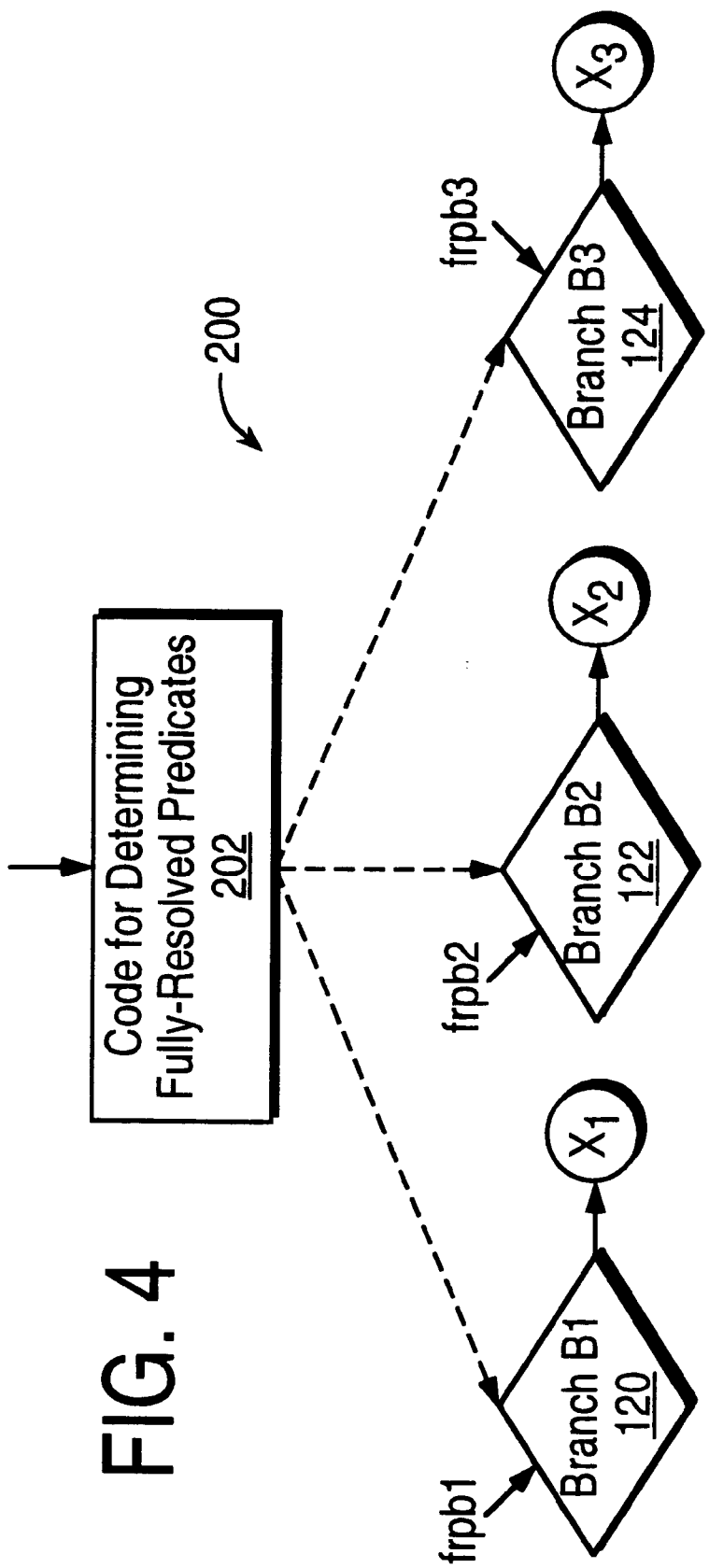
FIG. 4 shows an example scheduling of the branch operations in an optimized code sequence according to the present techniques.

FIG. 4 shows an example scheduling of the branch operations B1–B3 in an optimized code sequence 200 according to the present techniques. The branch operations B1–B3 are represented by a set of conditional branch operations 120–124 in the optimized code sequence 200. The conditional branch operations 120–124 depend on the fully-resolved predicates frpb1, frpb2, and frpb3, respectively. The optimized code sequence 200 includes a code block 202 having instructions for determining the fully-resolved predicates frpb1, frpb2, and frpb3 as well as the fully-resolved predicates frpc1, frpc2, and frpc3.

The fully-resolved predicates frpb1, frpb2, and frpb3 enable flexible scheduling of the branch operations B1–B3. The dotted line paths between the code block 202 and the blocks 120–124 indicate that the branch operations B1–B3 in the optimized code sequence 200 may be executed in any order after the code block 202. In fact, each one of the branch operations B1–B3 may be scheduled for execution as soon as its corresponding fully-resolved predicate frpb1, frpb2, or frpb3, respectively, is available.

The fall thru condition of each of the branch operations B1–B3 leads toward the fall thru exit path $X_4$ and to the code block 3 assuming none of the other branch operations B1–B3 cause a branch when executed. The instructions contained in the code block 202 determine the fully-resolved predicates frpb1, frpb2, and frpb3 such that at most one of the branch operations B1–B3 can result in a branch to one of the exit paths $X_1$ through $X_3$.

The flexible scheduling provided by the fully-resolved predicates frpb1, frpb2, and frpb3 enables a software code compiler to schedule the branch operations B1–B3 for execution in any order. In addition, the fully-resolved predicates frpbl, frpb2, and frpb3 enable execution of the branch operations B1–B3 in parallel in target processors having multiple branch execution resources.

A non-speculative operation is not necessarily always guarded with a fully-resolved predicate. A non-speculative operation guarded by a true predicate may be scheduled below all exit branches which preceded it in the source program. This operation will not be executed when any of the exit branches take and thus is properly guarded. In general, some non-speculative operations may be guarded using a fully-resolved predicate and allowed to move upward across previous branches while other non-speculative operations are guarded using the true predicate and held below all branches which preceded it in the original program.

In addition, the fully-resolved predicates frpc1, frpc2, and frpc3 enable flexible scheduling of the code blocks 1–3. The code blocks 1–3 may be scheduled in the optimized code sequence 200 in any order after the code block 202. In fact, each one of the code blocks 1–3 may be scheduled for execution as soon as its corresponding fully-resolved predicate frpc1, frpc2, or frpc3, respectively, is available.

An example code sequence suitable for optimization with the present techniques is shown below in a pseudo-code.

```
e1 = cmp (x==error1)    *test reg x for error1
br err1 if e1           *branch B1 depends on error1
str data1,mem           *otherwise store data1 to mem
e2 = cmp (x==error2)    *test reg x for error2
br err2 if e2           *branch B2 depends on error2
str data2,mem           *otherwise store data2 to mem
e3 = cmp (x==error3)    *test reg x for error3
br err3 if e1           *branch B3 depends on error3
cont4:                  *the fall thru exit path
str data3,mem           *store data3 to mem
```

The error conditions e1 through e3 correspond to the branch conditions $C_1$ through $C_3$ in the code sequence 100. The code blocks 1–3 correspond to the store memory instructions str data1,mem through str data3,mem, respectively. The branch target addresses err1 through err3 correspond to the exit paths $X_1$ through $X_3$ in code sequence 100. The code block 3 containing the store memory instruction str data3,mem corresponds to the fall thru exit path $X_4$ of the code sequence 100.

An example of the code block 202 containing instructions for determining fully-resolved predicates for the above example code sequence 100 is shown below in the pseudo-code.

```
t1 = x==error1       *test for error1
t2 = x==error2       *test for error2
t3 = x==error3       *test for error3
frpb1 = t1           *determine FRP for branch B1
frpc1 = !t1          *determine FRP for code block 1
frpb2 = AND (frpc1,t2)     *determine FRP for branch B2
frpc2 = AND (frpc1,!t2)    *determine FRP for code block 2
frpb3 = AND (frpc2,t3)     *determine FRP for branch B3
frpc3 = AND (frpc2,!t3)    *determine FRP for code block 3
```

An example of scheduling of the optimized code sequence 200 for the example code sequence 100 is shown below in the pseudo-code.

```
t1 = x==error1       *test for error1
t2 = x==error2       *test for error2
t3 = x==error3       *test for error3
frpb1 = t1           *FRP for branch B1
frpc1 = !t1          *FRP for code block 1
frpb2 = AND (frpc1,t2)     *FRP for branch B2
frpc2 = AND (frpc1,!t2)    *FRP for code block 2
frpb3 = AND (frpc2,t3)     *FRP for branch B3
frpc3 = AND (frpc2,!t3)    *FRP for code block 3
*
*once the FRPs are determined the branches B1–B3 and
*code blocks 1–3 can be scheduled for execution in any
*order
*
br err1 if frpb1         *branch B1 depends on frpb1
str data1,mem if frpc1   *code block 1 depends on frpc1
br err2 if frpb2         *branch B2 depends on frpb2
str data2,mem if frpc2   *code block 2 depends on frpc2
br err3 if frpb3         *branch B3 depends on frpb3
str data3,mem if frpc3   *code block 3 depends on frpc3
```

Another example of scheduling of the optimized code sequence 200 for the example code sequence 100 is shown below in the pseudo-code. In this example, each of the branch operations B1–B3 and the code blocks 1–3 is scheduled as soon as its corresponding fully-resolved predicate is available.

```
t1 = x==error1       *test for error1
t2 = x==error2       *test for error2
t3 = x==error3       *test for error3
*
*once an FRP is determined the corresponding branch or
*code block is scheduled for execution
*
frpb1 = t1           *determine FRP for branch B1
br err1 if frpb1         *branch B1 is scheduled
*
frpc1 = !t1          *determine FRP for cod block 1
str data1,mem if frpc1   *cod block 1 is scheduled
*
frpb2 = AND (frpc1,t2)     *determine FRP for branch B2
br err2 if frpb2         *branch B2 is scheduled
*
frpc2 = AND (frpc1,!t2)    *determine FRP for code block 2
str data2,mem if frpc2   *code block 2 is scheduled
*
frpb3 = AND (frpc2,t3)     *determine FRP for branch B3
br err3 if frpb3         *branch B3 is scheduled
*
frpc3 = AND (frpc2,!t3)    *determine FRP for code block 3
str data3,mem if frpc3   *code block 3 is scheduled
```

Figure 5:
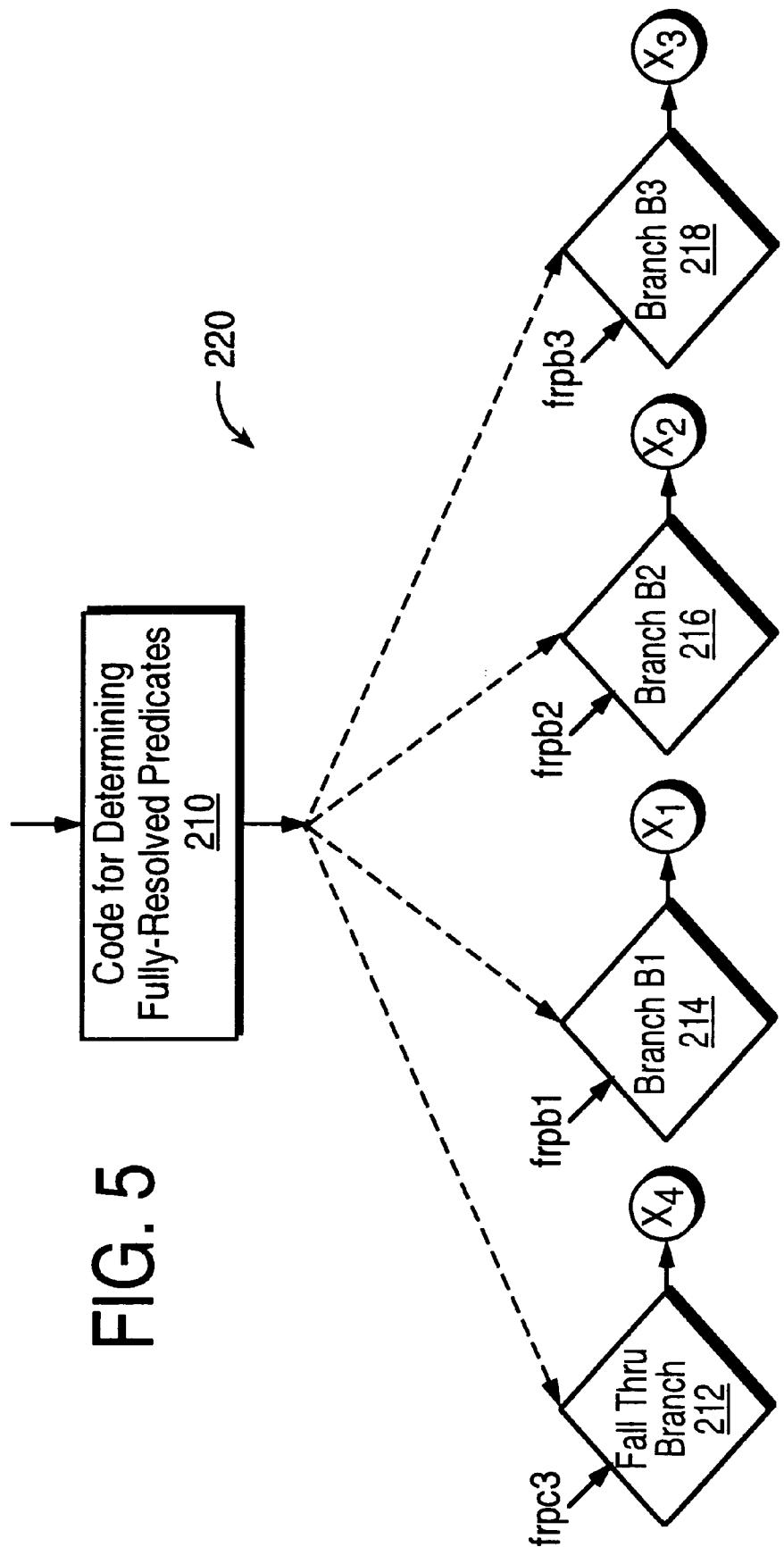
FIG. 5 illustrates another example of scheduling an optimized code sequence according to the present techniques including a fall thru branch instruction.

FIG. 5 illustrates an example of scheduling an optimized code sequence according to the present techniques including a fall thru branch instruction. The branch operations B1–B3 are represented by a set of conditional branch operations 214–218 in the optimized code sequence 220. The conditional branch operations 214–218 depend on the fully-resolved predicates frpb1, frpb2, and frpb3, respectively. A compiler according to the present techniques generates a fall thru branch operation 212 that depends on frpc3.

The optimized code sequence 220 includes a code block 210 having instructions for determining the fully-resolved predicates frpb1, frpb2, and frpb3 as well as the fully-resolved predicates frpc1, frpc2, and frpc3. Once the fully-resolved predicates frpb1, frpb2, frpb3 and frpc3 are determined then the branch operations B1–B3 and the fall thru branch operation 212 can be executed in any order. The fully-resolved predicates generated at block 220 enable a compiler to treat all conditional branches including the fall thru conditional branch equally and schedule these branches in any order.

In this example, an on-trace, i.e. most probable, code path is identified in the original code sequence 100 and is scheduled first in an optimized code sequence 220. The on-trace path, in this example, is identified as the fall through exit path $X_4$. An example scheduling of the optimized code sequence 220 based upon the on-trace code path is shown below in the pseudo-code.

```
t1 = x==error1        *test for error1
t2 = x==error2        *test for error2
t3 = x==error3        *test for error3
frpb1 = t1            *FRP for branch B1
frpc1 = !t1           *FRP for code block 1
frpb2 = AND (frpc1,t2)    *FRP for branch B2
frpc2 = AND (frpc1,!t2)   *FRP for code block 2
frpb3 = AND (frpc2,t3)    *FRP for branch B3
frpc3 = AND (frpc2,!t3)   *FRP for code block 3
*
*once the frpc3 is determined a fall thru branch that
*depends on frpc3 is scheduled
*
br cont4 if frpc3     *fall thru branch
*
br err1 if frpb1      *branch B1 depends on frpb1
str data1,mem if frpc1    *code block 1 depends on frpc1
br err2 if frpb2      *branch B2 depends on frpb2
str data2,mem if frpc2    *code block 2 depends on frpc2
br err3 if frpb3      *branch B3 depends on frpb3
*
cont4:                *fall thru exit path
str data3,mem         *fall thru code block 3
```

The flexible scheduling of non-speculative instructions requires the computation of a sequence of fully-resolved predicates which are used to guard non-speculative operations. It is often beneficial to compute fully-resolved predicates in a manner which quickly evaluates each fully-resolved predicate and keeps the amount of requisite computation to a minimum. For example, each fully-resolved predicate could be computed independently of all other fully-resolved predicates. This would allow each fully-resolved predicate individually to be computed in the fastest manner, but would promote excessive amounts of redundant computation in evaluating the fully-resolved predicates.

Figure 6:
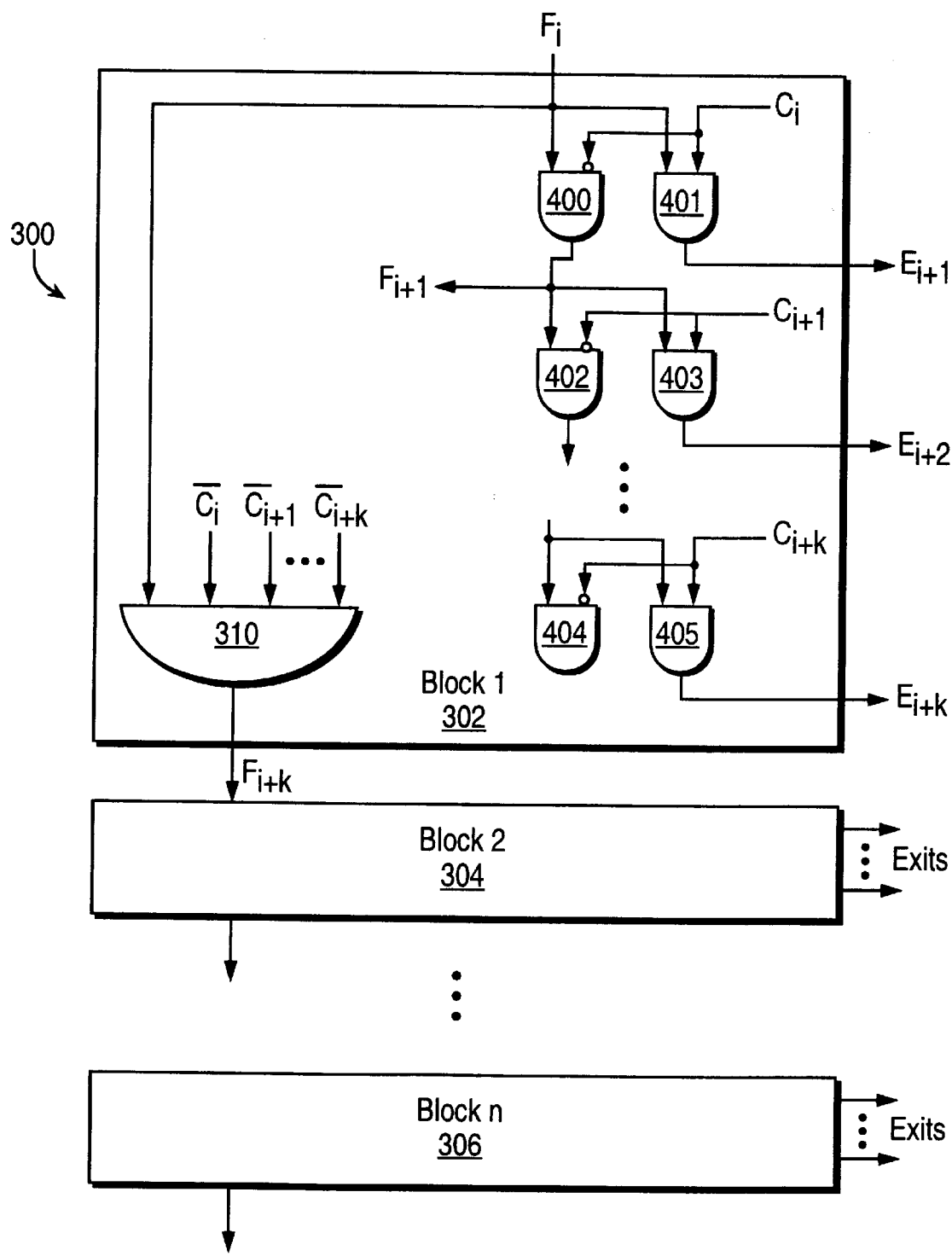
FIG. 6 shows a superblock that is subdivided into a set of blocks 1–n for determination of expedited fully-resolved predicates.

A method which may be referred to as blocked control substitution is used to quickly calculate fully-resolved predicates in a superblock while controlling the amount of redundant computation. When the fully-resolved predicate computation for a single superblock is "blocked" then special fully-resolved predicates are selected for expedited computation. FIG. 6 shows a superblock 300 that is subdivided into a set of blocks 1–n which are denoted as elements 302–306. Each expedited fully-resolved predicate terminates a block while intervening fully-resolved predicates within the blocks are computed sequentially as represented by a set of logic functions 400–405 in block 1. For example, an expedited fully resolved predicate $F_{i+k}$ terminates block 1.

The expedited fully resolved predicate $F_{i+k}$ is computed using a multiple input logical AND operation 310 which conjoins a previous expedited fully-resolved predicate $F_i$ with intervening branch conditions $C_i$ through $C_{i+k}$ to calculate a newly expedited fully resolved predicate. The multiple input AND operation 310 (or an alternative logical OR operation) can be computed using a network of two input AND operations or any other means of combining branch conditions in a conjunction. However, the expedited fully-resolved predicate computation does not automatically calculate intervening fully-resolved predicates as a side effect of the computations. Intervening fully resolved predicates must still be computed and may be computed sequentially. Blocking the fully-resolved predicate computation substantially increases the speed with which each expedited fully-resolved predicate appears in the chain of expedited fully-resolved predicates. The computation of all subsequent fully-resolved predicates, both expedited and non-expedited, which are computed from a previously expedited fully-resolved predicate are accelerated due to the early availability of a key input to this subsequent computation.

In some cases, the introduction of a single fall-thru branch is not the most effective means for achieving efficient program execution. Consider a program where a long superblock has been formed consisting of a number of branches, each of which taken separately is expected to fall through. On the other hand, when all exit branches are considered collectively, execution departs from the on-trace path a substantial fraction of the time. In this case, off-trace execution performance must be considered to be important.

If only a single fall-through branch is introduced at the bottom of the superblock, operations including branches which are to be moved off-trace must be moved below the fall-through branch. The fully-resolved predicate for the fall-through branch is computed using a logical AND of compare conditions for all proceeding branches, which delays the earliest execution time of the fall-through branch. Any of the compare conditions might take a substantial time to compute and delay the computation of the fall-through branch. Branches which are pushed off-trace below the fall-through branch are necessarily reached after a substantial time delay required to compute and conjoin the branch conditions for multiple subsequent branches. When each of the off-trace branches is delayed below the fall-through branch, code is generated which is inefficient when the superblock exits off-trace.

Figure 7:
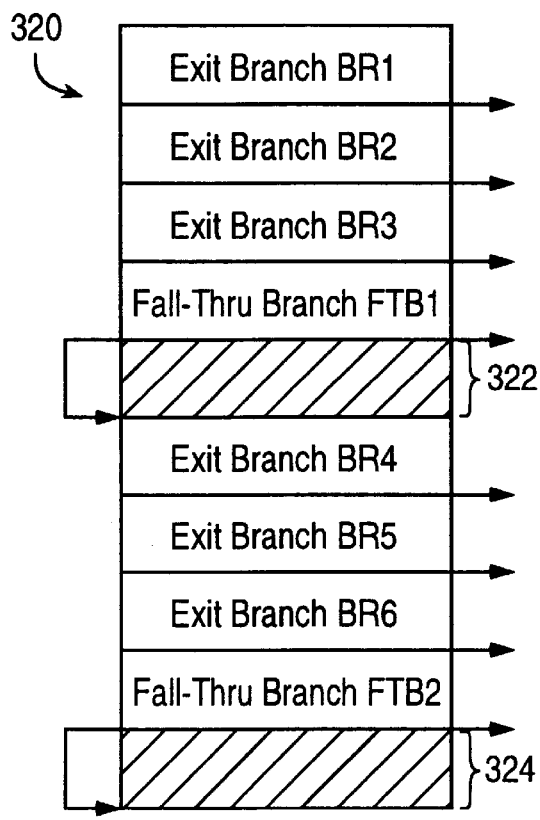
FIG. 7 shows a superblock which originally contained off-trace exit branches BR1–BR6.

A method is disclosed for alleviating this problem by introducing the use of multiple fall-through branches within a single scheduling unit. FIG. 7 shows a superblock 320 which originally contained off-trace exit branches BR1–BR6. A pair of fall-through branches FTB1–FTB2 have been introduce after BR3 and BR6 respectively. Each of the fall-through branches FTB1–FTB2 uses a branch condition computed as a fully-resolved predicate. The fall-through branch FTB1 uses a fully-resolved predicate corresponding to the original program not taking the exit branches BR1–BR3 while the fall-through branch FTB2 uses a fully-resolved predicate corresponding to the original program not taking the exit branches BR1–BR6. Code which is requires off-trace may be moved into the code region 322 below FTB1. Code moved off-trace at the non-final fall-through branch FTB1 can execute with less time delay than code moved off-trace at the final fall-through branch FTB2.

Examples of code which can moved=off-trace include the original branches BR1–BR6 as well as any operations required to compute the target addresses for off-trace branches. The branches BR1–BR3 could move off-trace and into the code region 322 and thereby decrease the amount of computation performed on-trace. When placed in the code region 322, the branches BR1–BR3 are reached more quickly than when they are placed in the region 324. This is especially important in long superblocks where delaying of all off-trace branches below a final fall-through branch unnecessarily penalizes off-trace exits.

Figure 8:
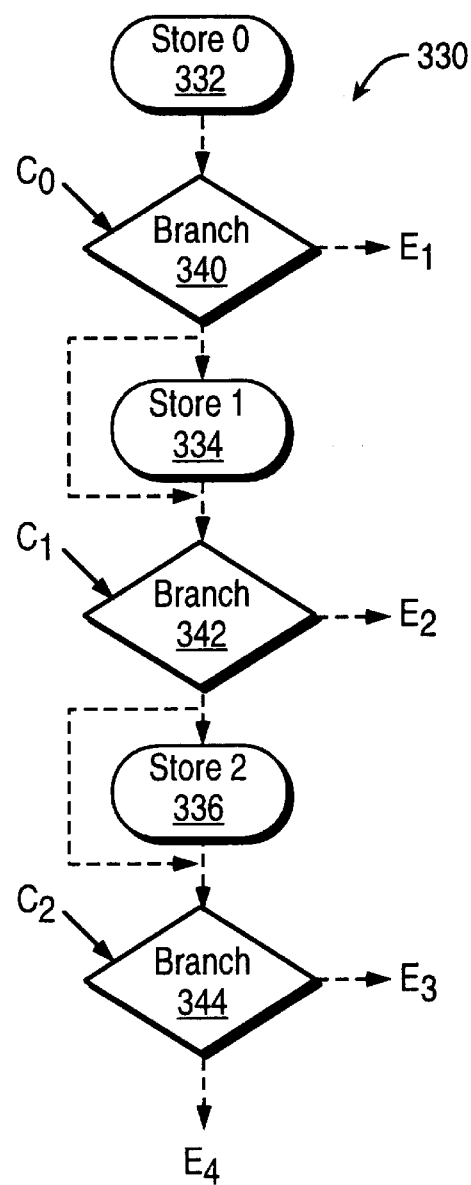
FIG. 8 shows an original superblock consisting of a sequence of branches guarding store operations.
Figure 9:
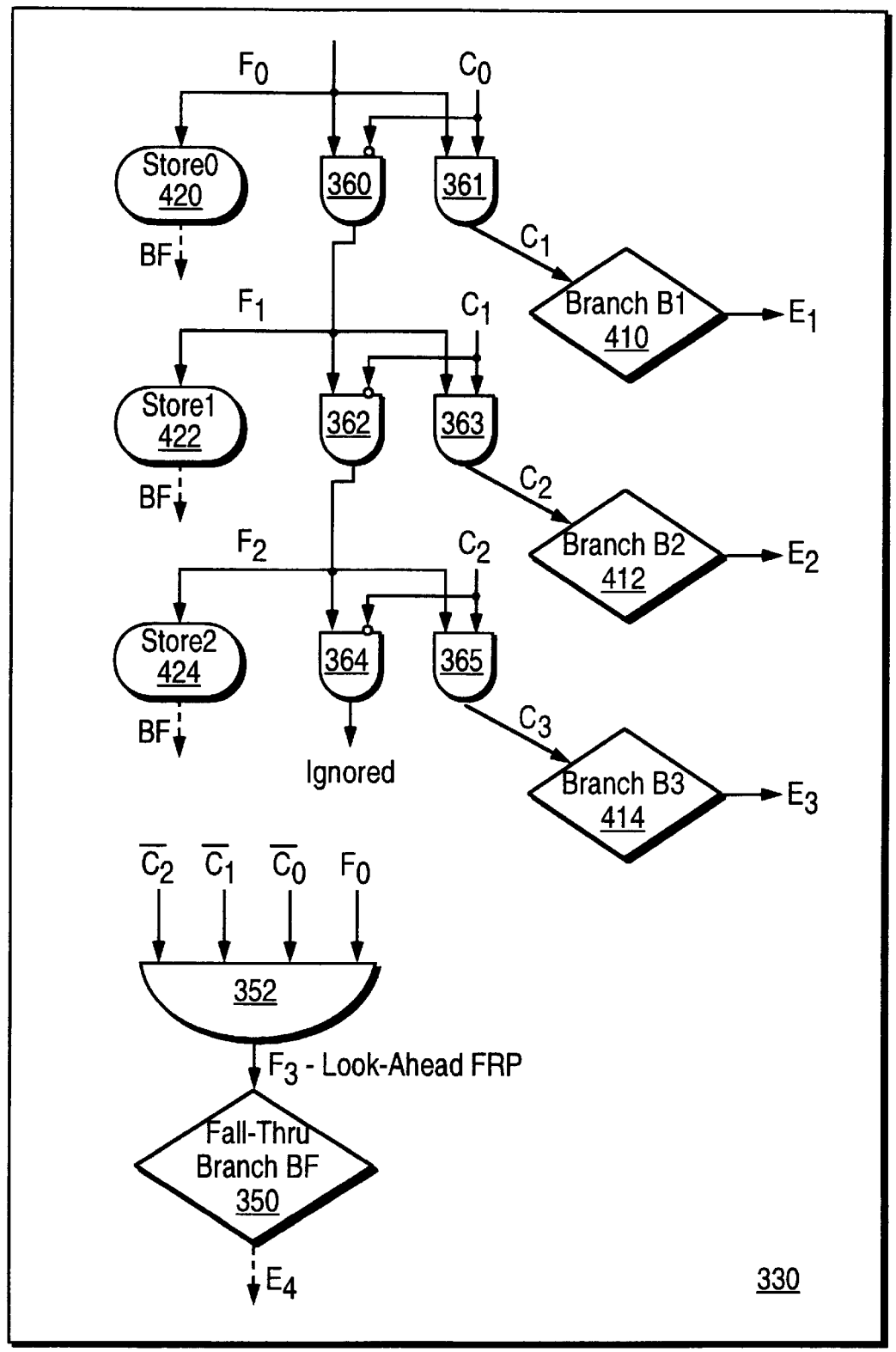
FIG. 9 shows fully-resolved predicates that are computed and used to guard branch operations as well as store operations in the superblock.

FIG. 8 shows an original superblock 330 consisting of a sequence of branches 340–344 guarding store operations 332–336. Fully-resolved predicates have been computed to accelerate the code shown. FIG. 9 shows that fully-resolved predicates are computed and used to guard the branch operations 410–414 as well as the store operations 420–424 in the superblock 330. A look ahead branch 350 has been inserted and its fully-resolved predicate $F_3$ has been computed using a separate logical AND operation 352 which has been reorganized in order to expedite the availability of the fully-resolved predicate for the look ahead branch 350. The logical AND operation 352 may be accelerated using a tree of binary AND operations or any other means to quickly calculate the fully-resolved predicate for the look ahead branch 350. However, fastest means to compute the $F_3$ does not always provide other results such as the fully-resolved predicates $F_0$–$F_2$ for branches which preceded the look ahead branch in the original superblock 330. In the left had portion of FIG. 9 the logical AND operations 360–365 required to compute intervening fully-resolved predicates remain trapped on-trace because they are used to properly guard non-speculative store operations 420–424 (store 0–2) which were originally executed on-trace and must remain on-trace to correctly executed the program corresponding to the original superblock 330.

Figure 10:
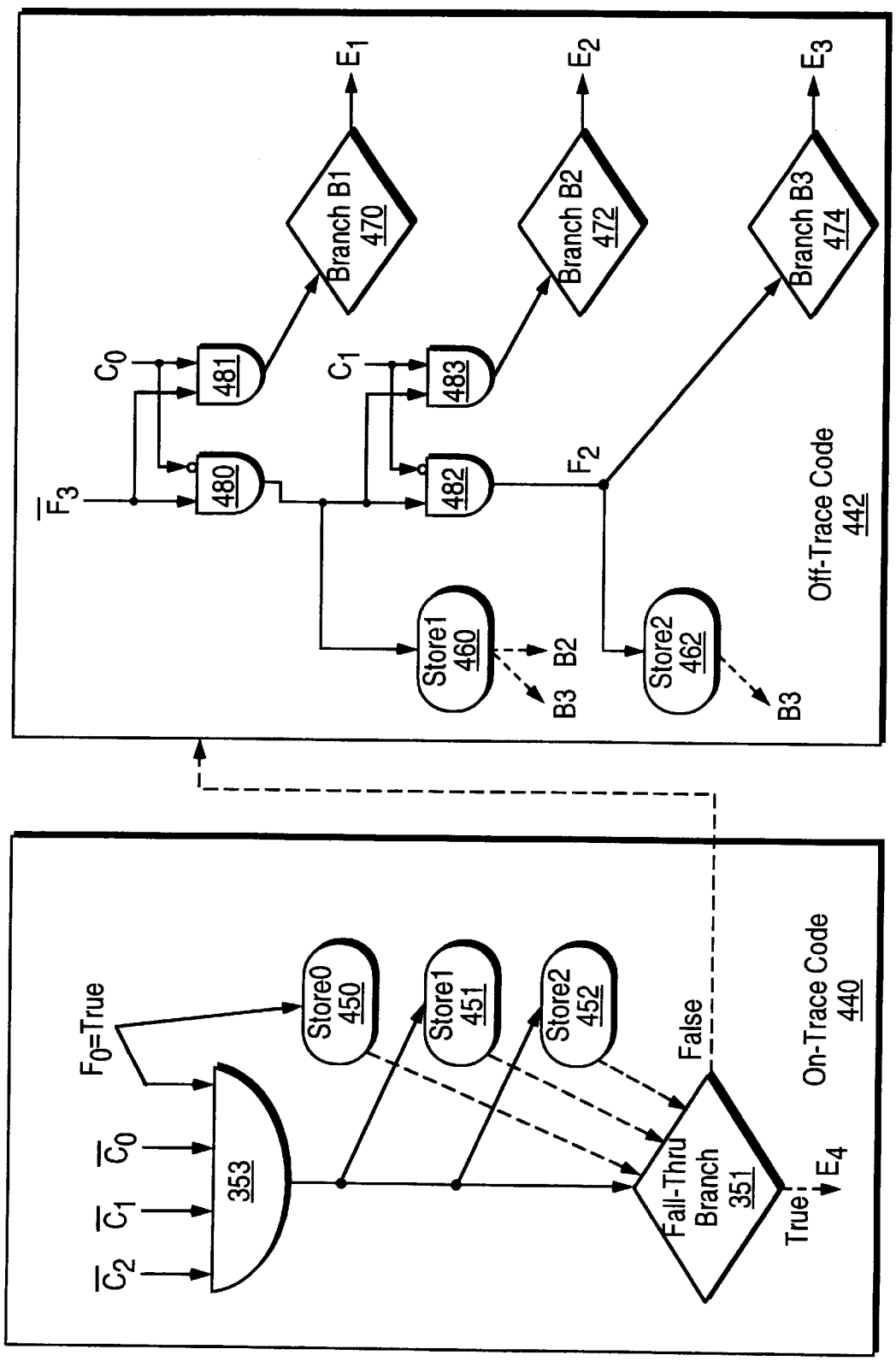
FIG. 10 illustrates a technique which eliminates the on-trace computation of many the fully-resolved predicates.

FIG. 10 illustrates a technique which eliminates the on-trace computation of many the fully-resolved predicates. The only fully-resolved predicate computed in the on-trace code 440 is the fully-resolved predicate for the fall-through branch 351 via logic 353. On-trace stores 450–452 to memory are guarded using the fully-resolved predicate for the fall-through branch 351 or its complement depending on the true/false sense of the fall through branch 351. Stores which are guarded in this manner execute when program flow remains on-trace as they should. Incorrect program execution results unless these stores are also conditionally executed after departing the on-trace path at the fall-thru branch. A set of compensation code 442 is placed off-trace. The compensation code 442 computes fully-resolved predicates using a set of logic functions 480–483 and the fully-resolved predicates are used to guard copies 460–462 of the original stores located off-trace as well as branch operations 470–474. This rewritten program jointly allows the height reduction of the fall-thru fully-resolved predicate as well as minimization of the number of operations executed on-trace.

Figure 11:
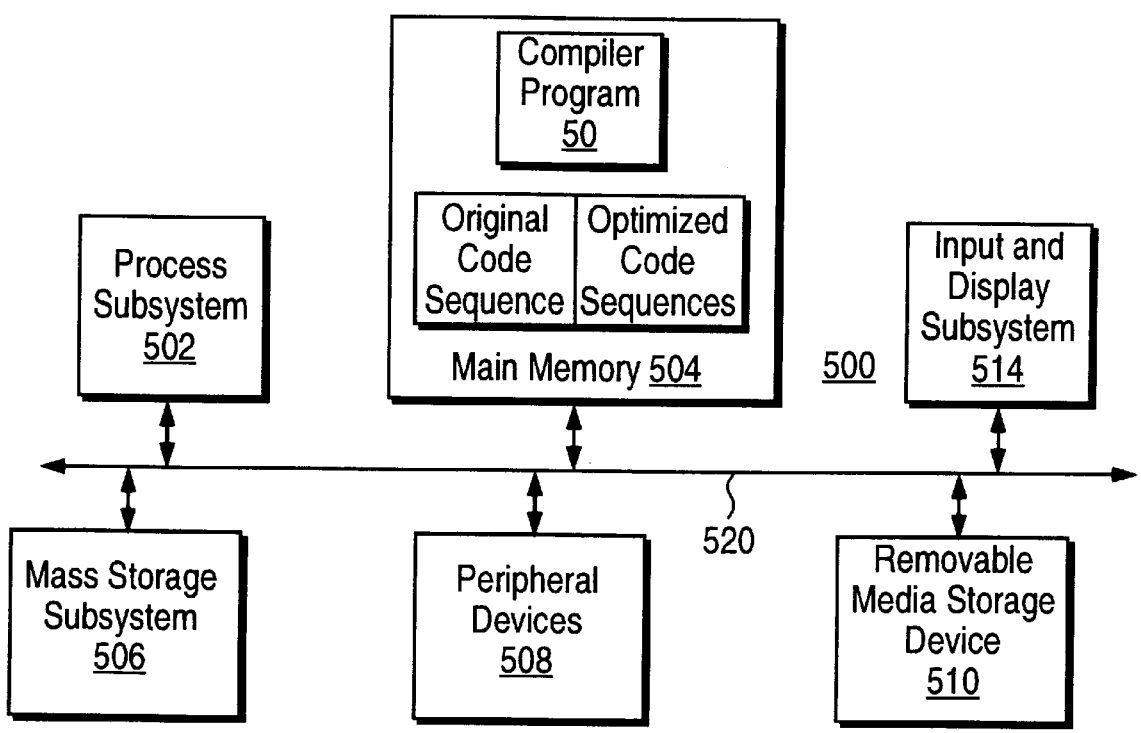
FIG. 11 illustrates a computer system that executes a compiler program which flexibly schedules non-speculative instructions according to the techniques disclosed herein.

FIG. 11 illustrates a computer system 500 that executes a compiler program 50 which generates fully-resolved predicates and that flexibly schedules non-speculative instructions according to the techniques disclosed herein. The computer system 500 includes a processor subsystem 502, a main memory 504 and an interconnect bus 520. The processor subsystem 502 may include a single microprocessor or central processing unit (CPU) or may include a plurality of microprocessors or CPUs.

The main memory 504 accommodates the storage of instructions and data for execution by the processor subsystem 502. The main memory 504 accommodates the compiler program 50 along with an original code sequence and the optimized code sequences described above. The main memory 504 may include dynamic random access memory (DRAM) as well as a cache memory.

The computer system 500 also includes a mass storage subsystem 506, a set of peripheral devices 508, a removable-media storage device 510, and an input and display subsystem 514. In one embodiment the various components of the computer system 500 communicate via the interconnect bus 520 which is a local bus. In other embodiments elements of the computer system 500 may be connected via one or more data transport mechanisms. Such transport mechanisms may include, for example, processor buses as well as specialized input/output peripheral buses.

The mass storage subsystem 506, which may be implemented with a magnetic disk drive or an optical disk drive, is a non-volatile storage device for storing data and instructions for use by the processor subsystem 502. In one embodiment, the mass storage subsystem 506 stores the compiler program 50 and related system software for loading to the main memory 506. The mass storage subsystem 506 also stores source code containing an original code sequence for loading to the main memory 506 and accommodates storage of object code including the optimized code sequences described above.

The removable-media storage device 510 operates in conjunction with a portable non-volatile storage medium, such as a magnetic tape, a floppy disk or a compact disc read only memory (CD-ROM), to input and output data and code to and from the computer system 500. In one embodiment, the compiler program 50 and related system software are stored and distributed on such a portable medium, and are input to the computer system 500 via the removable-media storage device 510.

The peripheral devices 508 may include any type of computer input device, such as an input/output (I/O) interface, to add additional functionality to the computer system 500. For example, the peripheral devices 508 may include a network interface card for interfacing the computer system 500 to a network. The compiler program 50 disclosed herein may be input to the computer system 500 via a portable storage medium or a network.

The compiler program 50 implements the techniques disclosed herein for flexible scheduling of non-speculative instructions. The compiler program 50 provides a plurality of computer executable instructions for implementation on a general purpose computer system such as the computer system 500. Prior to loading into the computer system 500, the compiler program 50 may reside as encoded information on a computer readable medium, such as a magnetic floppy disk, magnetic tape, and compact disc read only memory (CD-ROM).

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for flexible scheduling of a code sequence, comprising the steps of:

generating a set of instructions for determining a fully-resolved predicate for a non-speculative instruction which follows one or more branch instructions in the code sequence;

scheduling an optimized code sequence that includes the instructions for determining the fully resolved predicate and that further includes the non-speculative instruction guarded by the fully resolved predicate such that the fully-resolved predicate enables scheduling of the non-speculative instruction prior to any one or more of the branch instructions.

2. The method of claim 1, further comprising the steps of:

generating a set of instructions for determining a fully-resolved predicate for a fall thru exit of the code sequence;

scheduling a fall thru branch instruction guarded by the fully-resolved predicate for the fall thru exit such that the fall thru branch instruction may be executed before any one or more of the non-speculative instruction or branch instructions.

3. The method of claim 2, wherein the step of scheduling a fall thru branch instruction includes the step of determining an on-trace path in the code sequence and scheduling the fall thru branch instruction and the non-speculative instruction that correspond to the on-trace path ahead of other instructions.

4. The method of claim 1, further comprising the steps of:
generating a set of instructions for determining a fully-resolved predicate for each of a plurality of fall through branch instructions wherein the fully-resolved predicate for a given fall through branch instruction is based upon a fully-resolved predicate for a previous fall through branch instruction and a set of branch conditions of the branch instructions that occur before the given fall through branch instruction in the code sequence;
scheduling the fall thru branch instructions guarded by the fully-resolved predicates for the fall thru branch instructions such that one of the fall thru branch instructions may be executed before any one or more of the non-speculative instruction or the branch instructions.

5. The method of claim 1, further comprising the steps of:
generating a set of instructions for determining an expedited fully-resolved predicate for the non-speculative instruction of the code sequence;
scheduling the instructions for determining the expedited fully resolved predicate and the non-speculative instruction guarded by the expedited fully resolved predicate in the optimized code sequence such that the expedited fully-resolved predicate enables scheduling of the non-speculative instruction in the code sequences prior to any one or more of the branch instructions in the code sequence;
generating a set of compensation code that includes a set of instructions for determining a fully-resolved predicate for at least one other non-speculative instruction in the code sequence wherein the fully-resolved predicate for the other non-speculative instruction guards the other non-speculative instruction in the compensation code.

6. The method of claim 1, wherein the code sequence includes a set of conditional branch instructions.

7. The method of claim 6, further comprising the step of generating a set of code for determining a fully-resolved predicate for each of the conditional branch instructions such that only one of the conditional branch instructions can cause a branch in the optimized code sequence.

8. The method of claim 1, wherein the non-speculative instruction is a conditional branch instruction.

9. The method of claim 1, wherein the non-speculative instruction is a store memory instruction.

10. An apparatus for flexible scheduling of a code sequence, comprising:
means for generating a set of instructions for determining a a fully-resolved predicate for a non-speculative instruction which follows one or more branch instructions in the code sequence;
means for scheduling an optimized code sequence that includes the instructions for determining the fully resolved predicate and that further includes the non-speculative instruction guarded by the fully resolved predicate such that the fully-resolved predicate enables scheduling of the non-speculative instruction prior to any one or more of the branch instructions.

11. The apparatus of claim 11, further comprising:
means for generating a set of instructions for determining a a fully-resolved predicate for a fall thru exit of the code sequence;
means for scheduling a fall thru branch instruction guarded by the fully-resolved predicate for the fall thru exit such that the fall thru branch instruction may be executed before any one or more of the non-speculative instruction or branch instructions.

12. The apparatus of claim 11, wherein the means for scheduling a fall thru branch instruction includes means for determining an on-trace path in the code sequence and scheduling the fall thru branch instruction and the non-speculative instruction that correspond to the on-trace path ahead of other instructions.

13. The apparatus of claim 10, further comprising:
means for generating a set of instructions for determining a fully-resolved predicate for each of a plurality of fall through branch instructions wherein the fully-resolved predicate for a given fall through branch instruction is based upon a fully-resolved predicate for a previous fall through branch instruction and a set of branch conditions of the branch instructions that occur before the given fall through branch instruction in the code sequence;
means for scheduling the fall thru branch instructions guarded by the fully-resolved predicates for the fall thru branch instructions such that one of the fall thru branch instructions may be executed before any one or more of the non-speculative instruction or the branch instructions.

14. The apparatus of claim 10, further comprising:
means for generating a set of instructions for determining an expedited fully-resolved predicate for the non-speculative instruction of the code sequence;
means for scheduling the instructions for determining the expedited fully resolved predicate and the non-speculative instruction guarded by the expedited fully resolved predicate in the optimized code sequence such that the expedited fully-resolved predicate enables scheduling of the non-speculative instruction in the code sequences prior to any one or more of the branch instructions in the code sequence;
means for generating a set of compensation code that includes a set of instructions for determining a fully-resolved predicate for at least one other non-speculative instruction in the code sequence wherein the fully-resolved predicate for the other non-speculative instruction guards the other non-speculative instruction in the compensation code.

15. The apparatus of claim 10, wherein the code sequence includes a set of conditional branch instructions.

16. The apparatus of claim 15, further comprising means for generating a set of code for determining a fully-resolved predicate for each of the conditional branch instructions such that only one of the conditional branch instructions can cause a branch in the optimized code sequence.

17. The apparatus of claim 10, wherein the non-speculative instruction is a conditional branch instruction.

18. The apparatus of claim 10, wherein the non-speculative instruction is a store memory instruction.

19. A compiler program embodied on a computer-readable medium and executable by a computer for flexible scheduling of a code sequence, comprising:
code for generating a set of instructions for determining a fully-resolved predicate for a non-speculative instruction which follows one or more branch instructions in the code sequence;

code for scheduling an optimized code sequence that includes the instructions for determining the fully resolved predicate and that further includes the non-speculative instruction guarded by the fully resolved predicate such that the fully-resolved predicate enables scheduling of the non-speculative instruction prior to any one or more of the branch instructions.

20. The compiler program of claim 19, further comprising:

code for generating a set of instructions for determining a a fully-resolved predicate for a fall thru exit of the code sequence;

code for scheduling a fall thru branch instruction guarded by the fully-resolved predicate for the fall thru exit such that the fall thru branch instruction may be executed before any one or more of the non-speculative instruction or branch instructions.

21. The compiler program of claim 20, wherein the code for scheduling a fall thru branch instruction includes code for determining an on-trace path in the code sequence and scheduling the fall thru branch instruction and the non-speculative instruction that correspond to the on-trace path ahead of other instructions.

22. The compiler program of claim 19, further comprising:

code for generating a set of instructions for determining a fully-resolved predicate for each of a plurality of fall through branch instructions wherein the fully-resolved predicate for a given fall through branch instruction is based upon a fully-resolved predicate for a previous fall through branch instruction and a set of branch conditions of the branch instructions that occur before the given fall through branch instruction in the code sequence;

code for scheduling the fall thru branch instructions guarded by the fully-resolved predicates for the fall thru branch instructions such that one of the fall thru branch instructions may be executed before any one or more of the non-speculative instruction or the branch instructions.

23. The compiler program of claim 19, further comprising:

code for generating a set of instructions for determining an expedited fully-resolved predicate for the non-speculative instruction of the code sequence;

code for scheduling the instructions for determining the expedited fully resolved predicate and the non-speculative instruction guarded by the expedited fully resolved predicate in the optimized code sequence such that the expedited fully-resolved predicate enables scheduling of the non-speculative instruction in the code sequences prior to any one or more of the branch instructions in the code sequence;

code for generating a set of compensation code that includes a set of instructions for determining a fully-resolved predicate for at least one other non-speculative instruction in the code sequence wherein the fully-resolved predicate for the other non-speculative instruction guards the other non-speculative instruction in the compensation code.

24. The compiler program of claim 19, wherein the code sequence includes a set of conditional branch instructions.

25. The compiler program of claim 24, further comprising code for generating a set of code for determining a fully-resolved predicate for each of the conditional branch instructions such that only one of the conditional branch instructions can cause a branch in the optimized code sequence.

26. The compiler program of claim 19, wherein the non-speculative instruction is a conditional branch instruction.

27. The compiler program of claim 19, wherein the non-speculative instruction is a store memory instruction.

28. A computer-readable storage media that contains a compiler program that when executed by a computer enables flexible scheduling of a code sequence by performing the steps of:

generating a set of instructions for determining a a fully-resolved predicate for a non-speculative instruction which follows one or more branch instructions in the code sequence;

scheduling an optimized code sequence that includes the instructions for determining the fully resolved predicate and that further includes the non-speculative instruction guarded by the fully resolved predicate such that the fully-resolved predicate enables scheduling of the non-speculative instruction prior to any one or more of the branch instructions.

29. The computer-readable storage media of claim 28, wherein the compiler program when executed further performs the steps of:

code for generating a set of instructions for determining a a fully-resolved predicate for a fall thru exit of the code sequence;

code for scheduling a fall thru branch instruction guarded by the fully-resolved predicate for the fall thru exit such that the fall thru branch instruction may be executed before any one or more of the non-speculative instruction or branch instructions.

30. The computer-readable storage media of claim 29, wherein the step of scheduling a fall thru branch instruction includes the step of determining an on-trace path in the code sequence and scheduling the fall thru branch instruction and the non-speculative instruction that correspond to the on-trace path ahead of other instructions.

31. The computer-readable storage media of claim 28, wherein the compiler program when executed further performs the steps of:

generating a set of instructions for determining a fully-resolved predicate for each of a plurality of fall through branch instructions wherein the fully-resolved predicate for a given fall through branch instruction is based upon a fully-resolved predicate for a previous fall through branch instruction and a set of branch conditions of the branch instructions that occur before the given fall through branch instruction in the code sequence;

scheduling the fall thru branch instructions guarded by the fully-resolved predicates for the fall thru branch instructions such that one of the fall thru branch instructions may be executed before any one or more of the non-speculative instruction or the branch instructions.

32. The computer-readable storage media of claim 28, wherein the compiler program when executed further performs the steps of:

generating a set of instructions for determining an expedited fully-resolved predicate for the non-speculative instruction of the code sequence;

scheduling the instructions for determining the expedited fully resolved predicate and the non-speculative instruction guarded by the expedited fully resolved predicate in the optimized code sequence such that the expedited fully-resolved predicate enables scheduling of the non-speculative instruction in the code sequences prior to any one or more of the branch instructions in the code sequence;

generating a set of compensation code that includes a set of instructions for determining a fully-resolved predicate for at least one other non-speculative instruction in the code sequence wherein the fully-resolved predicate for the other non-speculative instruction guards the other non-speculative instruction in the compensation code.

33. The computer-readable storage media of claim 28, wherein the code sequence includes a set of conditional branch instructions.

34. The computer-readable storage media of claim 33, wherein the compiler program when executed further performs the step of generating a set of code for determining a fully-resolved predicate for each of the conditional branch instructions such that only one of the conditional branch instructions can cause a branch in the optimized code sequence.

35. The computer-readable storage media of claim 28, wherein the non-speculative instruction is a conditional branch instruction.

36. The computer-readable storage media of claim 28, wherein the non-speculative instruction is a store memory instruction.

* * * * *